US012777327B2

(12) United States Patent
Amin et al.

(10) Patent No.: US 12,777,327 B2
(45) Date of Patent: Oct. 27, 2026

(54) DYNAMICALLY HANDLING IP ADDRESS CHUNK SYNC FAILURES

(71) Applicant: T-Mobile USA, Inc., Bellevue, WA (US)

(72) Inventors: Rahul Amin, Issaquah, WA (US); Saravana Velusamy, Overland Park, KS (US)

(73) Assignee: T-Mobile USA, Inc., Bellevue, WA (US)

( * ) Notice: Subject to any disclaimer, the term of this patent is extended or adjusted under 35 U.S.C. 154(b) by 176 days.

(21) Appl. No.: 18/910,309

(22) Filed: Oct. 9, 2024

(65) Prior Publication Data

US 2026/0101177 A1 Apr. 9, 2026

(51) Int. Cl.

| | |
|---|---|
| ***H04W 8/26*** | (2009.01) |
| ***H04L 61/2503*** | (2022.01) |
| ***H04L 61/5007*** | (2022.01) |
| ***H04L 61/5061*** | (2022.01) |

(52) U.S. Cl.

CPC .......... *H04W 8/26* (2013.01); *H04L 61/2503* (2013.01); *H04L 61/5007* (2022.05)

(58) Field of Classification Search

None

See application file for complete search history.

(56) References Cited

U.S. PATENT DOCUMENTS

| | | | |
|---|---|---|---|
| 8,086,247 | B2 | 12/2011 | Kraufvelin et al. |
| 8,144,650 | B2 | 3/2012 | Olsson et al. |
| 9,813,940 | B2 | 11/2017 | Chen |
| 9,882,733 | B2 | 1/2018 | Hua et al. |
| 9,906,912 | B2 | 2/2018 | Roeland et al. |
| 9,935,694 | B2 | 4/2018 | Shan |
| 10,069,791 | B2 | 9/2018 | Bhaskaran et al. |
| 10,231,216 | B2 | 3/2019 | Watfa et al. |
| 10,448,352 | B1 | 10/2019 | Grayson et al. |
| 10,701,743 | B2 | 6/2020 | Shan |
| 10,848,525 | B2 | 11/2020 | Patil et al. |
| 10,904,947 | B2 | 1/2021 | Li et al. |
| 11,095,559 | B1 | 8/2021 | Garvia et al. |
| 11,166,337 | B2 | 11/2021 | Liu |
| 11,172,031 | B2 | 11/2021 | Yu et al. |
| 11,212,252 | B2 | 12/2021 | Cao et al. |

(Continued)

FOREIGN PATENT DOCUMENTS

| | | |
|---|---|---|
| CN | 110351899 A | 10/2019 |
| CN | 109429364 B | 6/2020 |

(Continued)

OTHER PUBLICATIONS

Dynamic IP Pool Chunk Allocation for 5G Packet Core (Prakash et al.), Sep. 25, 2020.*

*Primary Examiner* — Mohammad Yousuf A. Mian

(74) *Attorney, Agent, or Firm* — Ashurst Perkins Coie US LLP

(57) ABSTRACT

Methods, apparatus, and systems that relate to IP address assignment are disclosed. In one example aspect, a control plane device assigns a first IP address from a first IP address chunk associated with a user plane device. When the user plane device indicates that it does not have the first IP address, the control plane device deletes the first IP address chunk from its IP chunks table and assigns a second IP address from a second IP address chunk.

20 Claims, 6 Drawing Sheets

(56) References Cited

U.S. PATENT DOCUMENTS

| | | | |
|---|---|---|---|
| 11,258,708 | B2 | 2/2022 | Yang et al. |
| 11,337,046 | B2 | 5/2022 | Hoffmann et al. |
| 11,368,838 | B2 | 6/2022 | Tan et al. |
| 11,381,961 | B2 | 7/2022 | Zhu et al. |
| 11,388,762 | B2 | 7/2022 | Yao et al. |
| 11,395,354 | B2 | 7/2022 | Stammers et al. |
| 11,419,029 | B2 | 8/2022 | Sun et al. |
| 11,432,348 | B2 | 8/2022 | Albasheir et al. |
| 11,432,366 | B2 | 8/2022 | Zhu et al. |
| 11,452,020 | B2 | 9/2022 | Dodd-noble et al. |
| 11,483,278 | B1 | 10/2022 | Lifshitz |
| 11,490,450 | B1 | 11/2022 | Balmakhtar et al. |
| 11,558,346 | B2 | 1/2023 | Zong et al. |
| 11,689,956 | B2 | 6/2023 | Li et al. |
| 11,792,236 | B2 | 10/2023 | Agarwal et al. |
| 11,979,349 | B2 | 5/2024 | Zhang et al. |
| 12,004,264 | B2 | 6/2024 | Zhu et al. |
| 12,058,031 | B2 | 8/2024 | Molla et al. |
| 12,058,105 | B1 | 8/2024 | Ziegler et al. |
| 2013/0124717 | A1* | 5/2013 | Stevens ............... H04L 61/5007 709/224 |
| 2019/0053117 | A1* | 2/2019 | Bae ....................... H04W 76/30 |
| 2019/0200234 | A1* | 6/2019 | He ...................... H04W 12/108 |
| 2022/0377826 | A1 | 11/2022 | He et al. |
| 2023/0208804 | A1 | 6/2023 | He et al. |
| 2023/0262583 | A1 | 8/2023 | Muñoz De La Torre et al. |
| 2024/0022898 | A1 | 1/2024 | Ryu et al. |
| 2024/0114074 | A1 | 4/2024 | Watfa et al. |

FOREIGN PATENT DOCUMENTS

| | | | | |
|---|---|---|---|---|
| CN | 110417840 | B | 10/2020 | |
| CN | 110035562 | B | 2/2021 | |
| CN | 113938872 | B | 10/2023 | |
| CN | 115051970 | B | 9/2024 | |
| DE | 19843324 | C2 | 10/2000 | |
| EP | 0937289 | A1 | 8/1999 | |
| EP | 2689567 | B1 | 6/2015 | |
| EP | 2965473 | A1 | 1/2016 | |
| EP | 3248436 | A1 | 11/2017 | |
| EP | 3437352 | A1 | 2/2019 | |
| EP | 2583476 | B1 | 9/2019 | |
| EP | 3158816 | B1 | 10/2019 | |
| EP | 3742799 | A1 | 11/2020 | |
| EP | 3742800 | A1 | 11/2020 | |
| EP | 3777273 | A1 | 2/2021 | |
| EP | 3541142 | B1 | 7/2021 | |
| EP | 3756336 | B1 | 9/2021 | |
| EP | 4024817 | A1 | 7/2022 | |
| EP | 3737157 | B1 | 3/2023 | |
| EP | 3751898 | B1 | 3/2023 | |
| EP | 3818740 | B1 | 12/2023 | |
| EP | 4007224 | B1 | 3/2024 | |
| JP | 2003521138 | A | 7/2003 | |
| JP | 5876877 | B2 | 1/2016 | |
| JP | 5898189 | B2 | 3/2016 | |
| JP | 6374110 | B2 | 7/2018 | |
| KR | 100680076 | B1 | 2/2007 | |
| KR | 20190090904 | A * | 8/2019 | ......... H04L 61/6095 |
| KR | 102027260 | B1 | 10/2019 | |
| KR | 102216712 | B1 | 2/2021 | |
| KR | 20210142179 | A | 11/2021 | |
| WO | 2011054145 | A1 | 5/2011 | |
| WO | 2017124231 | A1 | 7/2017 | |
| WO | 2018214638 | A1 | 11/2018 | |
| WO | 2019011794 | A1 | 1/2019 | |
| WO | 2020093377 | A1 | 5/2020 | |
| WO | 2020249032 | A1 | 12/2020 | |
| WO | 2021204277 | A1 | 10/2021 | |

* cited by examiner

DYNAMICALLY HANDLING IP ADDRESS CHUNK SYNC FAILURES

BACKGROUND

In a wireless telecommunications network, allocating an internet protocol (IP) address to a subscriber device enables the device to communicate within the wireless telecommunications network and with external services. The IP address allocation process is part of an overall IP connectivity establishment mechanism for devices in the wireless telecommunications network's architecture.

BRIEF DESCRIPTION OF THE DRAWINGS

Detailed descriptions of implementations of the present invention will be described and explained through the use of the accompanying drawings.

Figure 1:
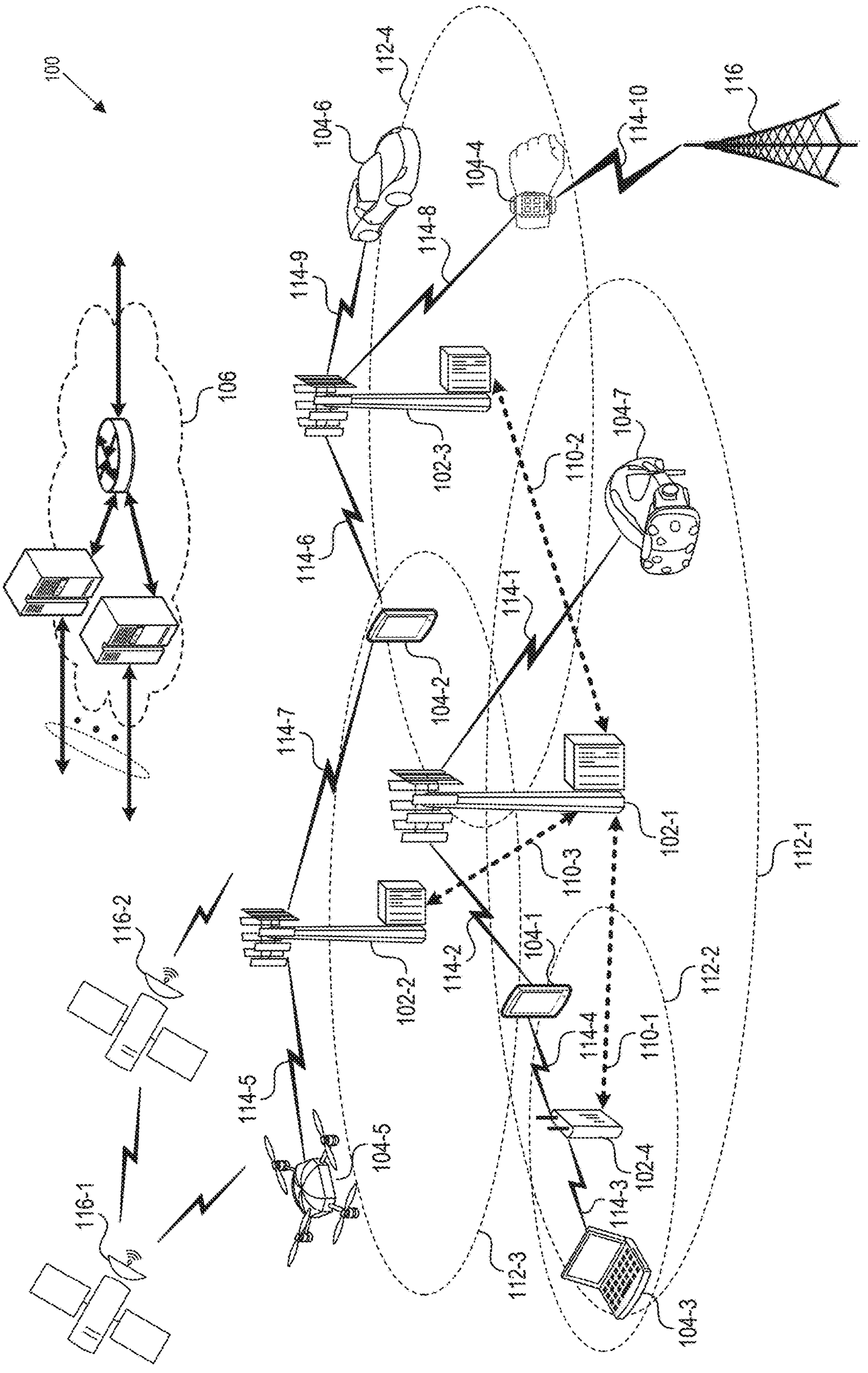
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed technology relates to a system for handling of IP address chunk assignment failures between a control plane network element and a user plane network element in a wireless telecommunications network. A 4G or 5G wireless telecommunications network employing a Control and User Plane Separation (CUPS) architecture can include a first network element that is configured to provide control plane network element functionality and at least a second network element that is configured to provide user plane network element functionality. In some implementations of the disclosed technology, when the wireless telecommunications network is a 5G network, the user plane (UP) network element can be a user plane function (UPF) and the control plane (CP) network element can be a session management function (SMF). In some implementations, when the wireless telecommunications network is a fourth generation (4G) network, the control plane network element can include a control plane-related function of a serving gateway (SGW) or a packet data network (PDN) gateway (PGW), and the user plane network element can include a user plane-related function of the SGW or PGW. The SMF can be configured to provide IP address management (IPAM) functionality in the network, including assigning an IP address to a user equipment (UE) in response to receiving a session establishment request from that UE. As part of its IPAM functionality, the SMF can be configured to divide a large pool of IP addresses allocated to that SMF into a plurality of smaller IP chunks and assign each of the smaller IP chunks to at least one UPF in the network.

When there is a mismatch between the assigned IP chunk(s), there remains a need for a mechanism for the UPF to notify the SMF and, subsequently, for the SMF to take a corrective action to avoid a session attach failure. Once the CP network element has assigned a new IP address to the UE, there is also a need to notify other network elements such as, for example, a policy control function (PCF) or a charging function (CHF) of the new IP address. This patent document discloses techniques that allow the CP network element, in response to receiving a protocol data unit (PDU) session request associated with a UE, to assign an IP chunk to the UP network element and for the UP network element to notify the CP network element when the assigned IP chunk does not belong to that UP network element. Further, this patent document discloses techniques that allow the CP network element to then delete the association between that assigned IP address chunk and assign a new IP chunk to the UP network element.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104 can correspond to or include network 100 entities capable of communication using various connectivity standards. In some implementations, a 5G communication channel can use access frequencies of 24 GHz or more. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, internet protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The coverage area 112 for a base station 102 can be divided into sectors making up only a portion of the coverage area (not shown). The network 100 can include base stations of different types (e.g., macro and/or small cell base stations). In some implementations, there can be overlapping coverage areas 112 for different service environments (e.g., Internet of Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term "eNBs" is used to describe the base stations 102, and in 5G new radio (NR) networks, the term "gNBs" is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances; etc.

A wireless device (e.g., wireless devices 104) can be referred to as a user equipment (UE), a customer premises equipment (CPE), a mobile station, a subscriber station, a mobile unit, a mobile device, a subscriber unit, a subscriber device, a wireless unit, a remote unit, a handheld mobile device, a remote device, a mobile subscriber station, a terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102 and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites, such as satellites 116-1 and 116-2, to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service (QoS) requirements and multi-terabits-per-second data transmission in the era of 6G and beyond, such as terabit-per-second backhaul systems, ultra-high-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low user plane latency. In yet another example of 6G, the network 100 can implement a converged Wi-Fi and Core architecture to increase and improve indoor coverage.

5G Core Network Functions

Figure 2:
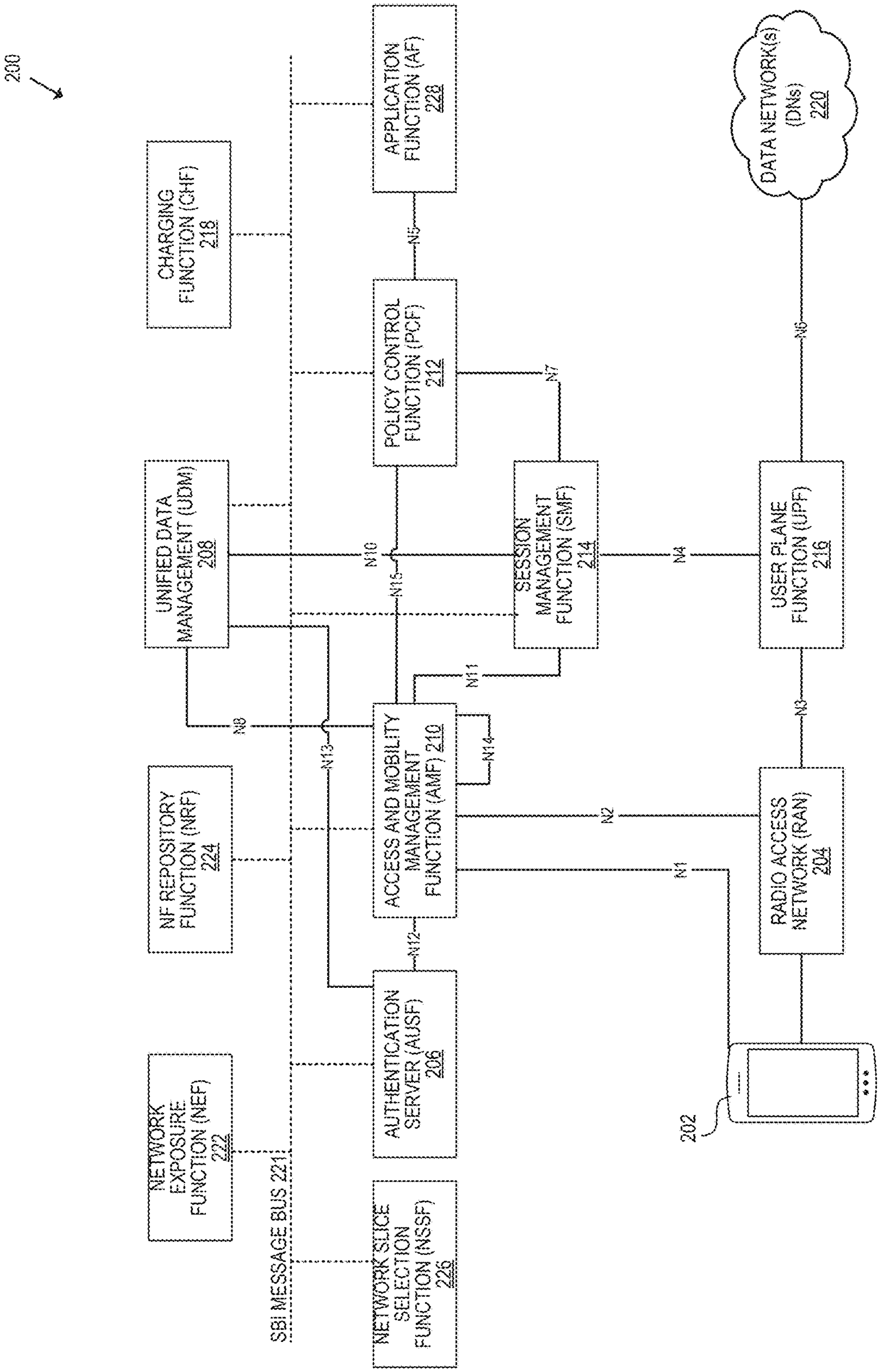
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNS) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, an NF Repository Function (NRF) 224, a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, and service-level agreements and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS) and can provide authentication credentials while being employed by the AMF 210 and SMF 214 to retrieve subscriber data and context.

The PCF 212 can connect with one or more Application Functions (AFs) 228. The PCF 212 supports a unified policy framework within the 5G infrastructure for governing network behavior. The PCF 212 accesses the subscription information required to make policy decisions from the UDM 208 and then provides the appropriate policy rules to the control plane functions so that they can enforce them. The SCP (not shown) provides a highly distributed multi-access edge compute cloud environment and a single point of entry for a cluster of NFs once they have been successfully discovered by the NRF 224. This allows the SCP to become the delegated discovery point in a datacenter, offloading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224 use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework that, along with the more typical QoS and charging rules, includes network slice selection, which is regulated by the NSSF 226.

Dynamically Handling IP Address Chunk Failures

In a wireless telecommunications network that employs the CUPS architecture, IP address pool allocation is done by a CP network element, whereas the actual IP address is conveyed per session by control plane to an UP network element. The user plane then provides data network connectivity to the subscriber by appropriately advertising the IP address subnets toward other parts of the wireless telecommunications network.

In some implementations, the CP network element can be communicatively coupled with at least one UP network element. The CP network element can be configured to assign at least one unique range of IP addresses, also referred to herein as an IP address chunk or IP chunk, to each of the UP network elements that are communicatively coupled to the CP network element. The CP network element can store the IP chunk assigned to each UP network element in an IP chunk table of the CP network element and further communicate each IP chunk assigned to each UP network element to that UP network element. In some implementations, the UP network element can store the IP chunk assignment received from the CP network element in an IP chunk table of the UP network element. In some implementations, when the CP network element receives a session establishment request from a subscriber device, the CP network element can assign a first IP address from a first IP chunk assigned to a first UP network element coupled with the CP network element and forward the session establishment request to the first UP network element. In some implementations, when, prior to the first UP network element receiving the session establishment request from the CP network element, a communication failure has occurred between the CP network element and the first UP network element such that the contents of the IP chunk tables of the CP and first UP network elements respectively are mismatched, e.g., out of sync with each other, the first UP network element can send a failure message to the CP network element indicating that the first UP network element does not have the first IP address assigned to the subscriber device in the first IP chunk table of the first UP network element. In some implementations of the disclosed technology, upon receiving the failure message from the first UP network element, the CP network element can dissociate or delete the first IP chunk from the first UP network element from the IP chunk table of the CP network element. In some implementations, the CP network element can then assign a second IP address from a second IP chunk assigned to the first UP network element to the subscriber device and forward the session establishment request to the second UP network. In some implementations, the CP network element can alternatively assign a third IP address from a third IP chunk assigned to a second UP network element to the subscriber device and forward the session establishment request to the second UP network. In some implementations, the CP network element can further communicate the second IP address to a policy control network element, a charging network element, or a policy and charging rules network element.

In a Fifth Generation (5G) wireless telecommunications network, for example, a user plane function (UPF) usually is deployed at a network edge using an architecture based on Multi-Access Edge Computing (MEC) to provide latency, bandwidth, and edge-specific services. In the 5G network, a control plane is usually deployed at a central location because it does not need strict latency and it needs integration to backend services, such as authentication, policy and network slice managements, charging and billing, and so on. In 5G, this control plane is referred to as Session Management Function (SMF). One SMF can manage many UPFs. An important function of the control plane is the allocation of IP pool chunks, which are small sets of IP address subnets. The centralized control plane typically assigns unique IP pools to the various user planes. A user plane typically receives dynamic IP addresses allocated by the control plane to the subscriber device, and it reports the status of IP pool chunk usage to the control plane. In some implementations, when a utilization of an IP address chunk to a first UPF decreases below a threshold, the SMF can be configured to withdraw that IP address chunk from the first UPF. In some implementations, the SMF can reassign the withdrawn IP address chunk to a second UPF. In some implementations, the SMF can make a plurality of attempts to communicate the assignment or withdrawal of an IP address chunk to or from the first or second UPF. In some implementations, the SMF can make the plurality of attempts to communicate the assignment or withdrawal of IP address chunks using a best effort or connectionless communication mechanism, which may not guarantee that a message containing the assignment or withdrawal will reach the intended recipient, for example, the first or the second UPF, of the message. As a result, due to a network disruption, a failover transition between a primary UPF and its backup UPF, a switchover transition between a primary UPF and a secondary UPF, or an unspecified communication failure between the SMF and the first UPF, a backup UPF of the first UPF, a primary UPF of the first UPF and a secondary UPF of the first UPF, the second UPF, a backup UPF of the second UPF, a primary UPF of the second UPF and a secondary UPF of the second UPF, or any combination of the aforementioned SMF and UPFs, the IP chunk tables of each of the aforementioned network elements may become out of sync with each other, e.g., a mismatch may exist among the contents of their respective IP chunk tables. Such mismatches may result in session attach failures or incorrect routing of data packets due to multiple UPFs advertising the same IP chunk to other network elements or routers in the wireless telecommunications network. Such failures may result in denial of service or a poor network experience for subscribers of the telecommunications network.

The mismatch of the assigned IP chunks can negatively impact customer experience. To address such problems, the disclosed techniques can be implemented, in some embodiments, as a call flow (e.g., invalid IP assignment handling call flow) that identifies the erroneous IP chunk(s), deletes such chunk(s), and triggers a new procedure to reassign a valid UE IP address for a successful session.

Figure 3:
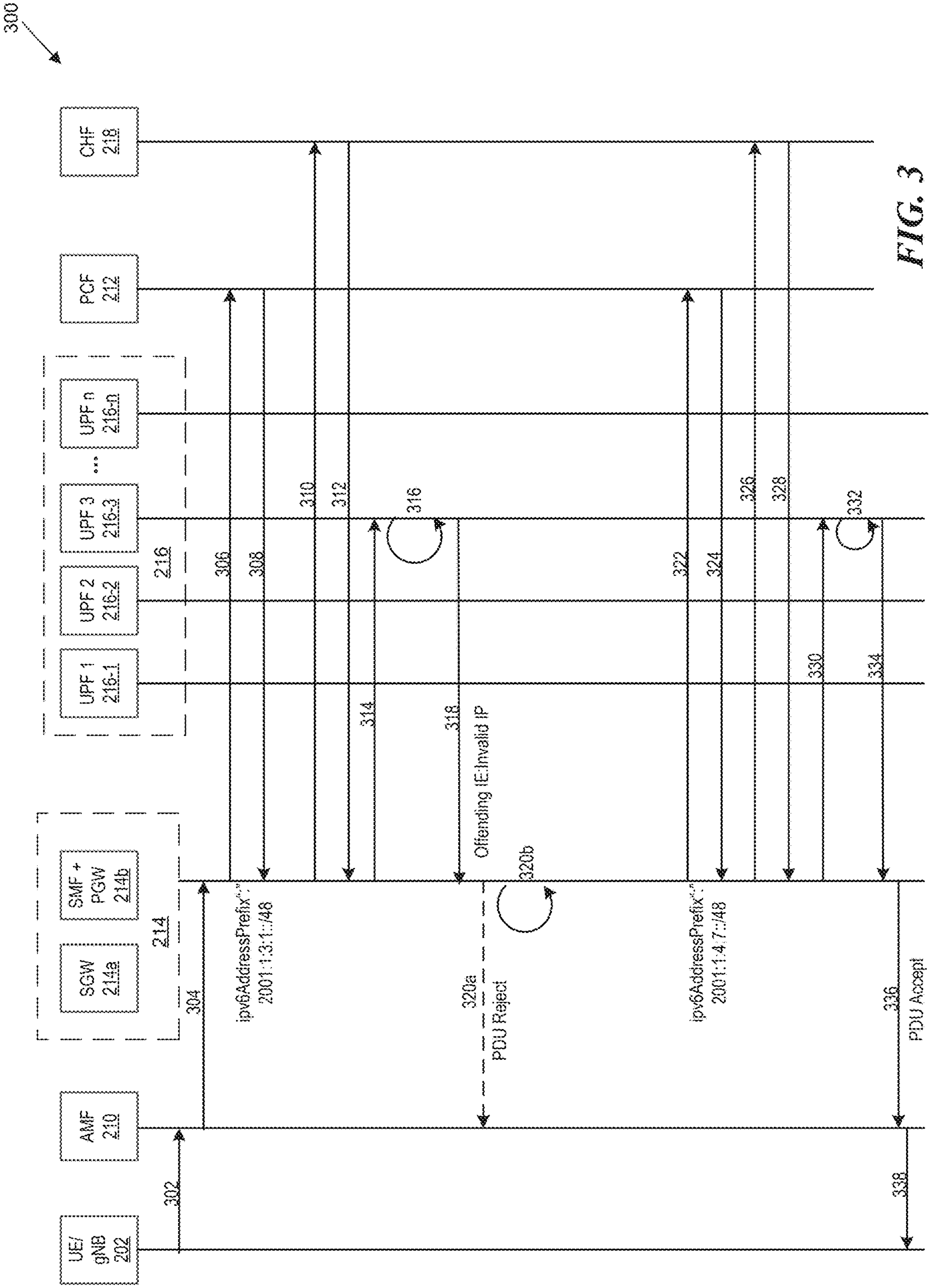
FIG. 3 is a call flow diagram of a process in which at least some aspects of the disclosed technology are implemented.

FIG. 3 is a call flow diagram of a process 300 in which at least some aspects of the disclosed technology are implemented. The process can be implemented in a system of a wireless telecommunications network. In some implementations, the wireless telecommunications network can be a network that operates on 4G LTE protocols and procedures. In some implementations, the wireless telecommunications network can be a network that operates on 5G protocols and procedures. In some implementations, the wireless telecommunications network can be a network that includes network elements that operate on Wi-Fi protocols.

In some implementations of the disclosed technology, when the wireless telecommunications network is a 5G network, the system can include an SMF 214 that is configured to operate as a control plane function in the system. In some implementations when the wireless telecommunications network is a combination of a 5G and a 4G LTE or Wi-Fi network, the SMF 214 can be configured to include a control plane-related function of a SGW 214*a*. In some implementations, when the wireless telecommunications network is a combination of a 5G and a 4G LTE or Wi-Fi network, the SMF 214 can further be configured to operate as a combination network element 214*b* that performs a control plane-related function of a PGW in addition to operating as a session management function. A person having ordinary skill in the art will recognize that the exact combination of the various functions of the SMF 214, SGW 214*a* or the combination network element 214*b* that are combined into a single network element or are split among multiple network elements is an implementation detail that may vary from one network equipment vendor to another. Accordingly, the logical, physical, and functional relationships among the network elements of functions 214, 214*a*, and 214*b* described herein are not to be construed as limiting.

In some implementations, when the wireless telecommunications network is a 5G network or a combination of 5G network and a 4G LTE or Wi-Fi network, the user plane functionality can be implemented on a plurality of user plane functions UPF-1 216-1, UPF-2 216-2, UPF-3, 216-3 and so on up to UPF-n 216-*n*. The plurality of user plane functions UPF-1 216-1, UPF-2 216-2, UPF-3, 216-3 and so on up to UPF-n 216-*n* can be collectively referred to as UPFs 216. In various implementations, each of the plurality of UPFs 216 can serve as backup UPFs for one another. For example, in some implementations, UPF-2 216-2 can serve as a backup UPF for UPF-1 216-1, and vice versa, and the functions performed by UPF-1 216-1 and UPF-2 216-2 may failover between the two UPFs for load balancing or redundancy purposes. In some implementations, each of the plurality of UPFs 216 can internally comprise a plurality of servers, with one server serving as the primary server and another server serving as a secondary server of the same UPF. For example, UPF-1 216-1 may internally comprise two servers that operate externally as a single UPF-1 216-1, and the functions performed by UPF-1 216-1 may switch over between the two servers for load balancing or redundancy purposes. A person having ordinary skill in the art will recognize that the exact hierarchy, interconnections, and relationships among the plurality of UPFs 216 are an implementation detail that may vary from one network equipment vendor to another or from one wireless telecommunications network to another. Accordingly, the logical, physical, and functional relationships among the plurality of UPFs 216 described herein are not to be construed as limiting.

In some implementations, the SMF 214 can be configured to perform IPAM functions in the network. As part of the IPAM functionality of the SMF 214, the SMF 214 can be configured to manage a large pool of IP addresses, also referred to herein as an IP address chunk of the SMF 214, a supernetwork of the SMF 214, or a supernet of the SMF 214. In some implementations, the SMF 214 can be configured to divide its IP address chunk into smaller IP address chunks and further assign at least one smaller IP address chunk to each of the plurality of UPFs 216. Each of the smaller IP address chunks assigned by the SMF 214 to the plurality of UPFs 216 can be referred to herein as a subnetwork or a subnet of the corresponding UPF of the plurality of UPFs 216. In some implementations, the SMF 214 can be configured to use Classless Inter-Domain Routing (CIDR) notation as part of its IPAM function. When the SMF 214 uses CIDR notation, network elements that belong to the same subnet can be addressed with an identical group of its most significant bits of their respective IP addresses, which results in a logical division of each IP address into two fields: a network number, also known as a routing prefix, and a rest field, also known as a host identifier. The routing prefix can be expressed as the first address of a network, followed by a slash character (/), and ending with the bit-length of the prefix. For example, 198.51.100.0/24 is the prefix of the IP version 4 (IPv4) network starting at the given address, having 24 bits allocated for the network prefix and the remaining 8 bits reserved for host addressing. Addresses in the range 198.51.100.0 to 198.51.100.255 belong to this network, with 198.51.100.255 as the subnet broadcast address. The IP version 6 (IPv6) address specification 2001:db8::/32 is a large IP address block with 296 addresses, having a 32-bit routing prefix. The SMF 214 can be configured to allocate an IP address to each UE connected to each of the plurality of UPF 216.

In some implementations, the SMF 214 can include an SMF IP chunks table which stores a list of each of the plurality of UPFs 216 managed by the SMF 214. For each of the plurality of UPFs 216 that is managed by the SMF 214, the SMF IP chunks table can further include a subnet identifier of each smaller IP address chunk assigned to that UPF. For example, as shown in Table 1 below, the SMF IP chunks table of SMF 214 can include the following entries, indicating that SMF 214 has allocated IP chunks 2001:1:1::/48 (referred to herein as chunk-1*a*) and 2001:1:9::/48 (referred to herein as chunk-1*b*) to UPF-1 216-1, IP chunk 2001:1:2::/48 (referred to herein as chunk-2*a*) to UPF-2 216-2, and IP chunks 2001:1:3::/48 (referred to herein as chunk-3*a*) and 2001:1:4::/48 (referred to herein as chunk-3*b*) to UPF-3 216-3. In some implementations, each of the plurality of UPFs 216 can include its own internal IP chunks tables respectively (not shown here).

TABLE 1

Example Table of IP Chunks
SMF IP Chunks Table

| UPF ID | Digest |
|---|---|
| UPF-1 | chunk-1a:2001:1:1::/48 |
| | chunk-1b:2001:1:9::/48 |
| UPF-2 | chunk-2a:2001:1:2::/48 |
| UPF-3 | chunk-3a:2001:1:3::/48 |
| | chunk-3b:2001:1:4::/48 |

Referring back to FIG. 3, at Operation 302, the AMF 210 receives a request from a wireless device, also referred to herein as user equipment (UE) 202 via a radio access network node such as an eNodeB or a gNodeB, to establish a protocol data unit (PDU) session. At Operation 304, the AMF 210 forwards the PDU session request to the SMF 214. At Operation 306, the SMF 214 assigns a first IP address, for example, an IP address from the IP address chunk 2001:1:3::/48 (referred to herein as chunk-3*a*) to the UE 202, and further sends a message to PCF 212 informing PCF 212 of the first IP address assigned to UE 202. The SMF IP chunks table of SMF 214 contains an entry that indicates that chunk-3*a* is assigned to UPF-3 216-3. In some implementations, the SMF 214 may assign an IP address for other network devices/elements in the network. At Operation 308, the PCF 212 sends an acknowledgement message to SMF 214 acknowledging receipt of the first IP address allocation for UE 202. At Operation 310, SMF 214 sends a message to CHF 218 informing CHF 218 of the first IP address assigned to UE 202. At Operation 312, the CHF 218 sends an acknowledgement message to SMF 214 acknowledging receipt of the first IP address allocation for UE 202.

At Operation 314, SMF 214 sends a session establishment request to UPF-3 216-3, which is the UPF to which chunk-3*a* is assigned. At 316, UPF-3 216-3 determines whether the first IP address assigned by SMF 214 to UE 202 matches an IP address in an internal IP chunks table of UPF-3 216-3. When UPF-3 216-3 has successfully received a most recent IP address chunk assignment from SMF 214, UPF-3 216-3 can determine that the first IP address assigned to UE 202 exists in its internal IP address chunks table, and UPF-3 216-3 can send an acknowledgement message to SMF 214. However, when UPF-3 216-3 has not successfully received a most recent IP address chunk assignment message from SMF 214, a mismatch may exist between the SMF IP chunks table of SMF 214 and the internal IP chunks table of UPF-3 216-3. In other words, the internal IP chunks table of UPF-3 216-3 may be out of sync in relation to the SMF IP chunks table of SMF 214. Such mismatch may exist, for example, due to a variety of reasons including a network or communications failure between SMF 214 and UPR-3 216-3, a failed or partially failed failover between UPF-3 216-3 and its backup UPF, a failed or partially failed switchover between a primary and a secondary server of UPF-3 216-3, etc. Thus, for example, while the SMF IP chunks table of SMF 214 may contain two entries—chunk-3*a* and chunk-3*b*—for UPF-3 216-3, the internal IP chunks table of UPF-3 216-3 may only contain an entry for chunk-3*b*.

In some implementations, at Operation 318, UPF-3 216-3 can send a failure message to SMF 214 that includes an information element (IE) that indicates that the first IP address assigned to UE 202 is an invalid IP address. In some implementations, instead of sending a PDU reject message rejecting the PDU session request (e.g., Operation 320*a*), SMF 214 can delete an association between chunk-3*a* and UPF-3 216-3 from the SMF IP chunks table of SMF 214 at Operation 320*b*. Table 2 shows an example of the IP chunks table of the SMF 214 after the aforementioned deletion.

TABLE 2

Example Table of IP Chunks after Deletion of chunk-3a
SMF IP Chunks Table

| UPF ID | Digest |
|---|---|
| UPF-1 | chunk-1a:2001:1:1::/48 |
| | chunk-1b:2001:1:9::/48 |
| UPF-2 | chunk-2a:2001:1:2::/48 |
| UPF-3 | chunk-3b:2001:1:4::/48 |

In some implementations, at Operation 322, the SMF 214 can assign a second IP address, for example, an IP address from the IP address chunk 2001:1:4::/48 (referred to herein as chunk-3*b*) to the UE 202, and further send a message to PCF 212 informing PCF 212 of the first IP address assigned to UE 202. The SMF IP chunks table of SMF 214 can contain an entry that indicates that chunk-3*b* is assigned to UPF-3 216-3. At Operation 324, the PCF 212 can send an acknowledgement message to SMF 214 acknowledging receipt of the second IP address allocation for UE 202. In some implementations, at Operation 326, SMF 214 can send a message to CHF 218 informing CHF 218 of the second IP address assigned to UE 202. At Operation 328, the CHF 218 can send an acknowledgement message to SMF 214 acknowledging receipt of the second IP address allocation for UE 202.

In some implementations, at Operation 330, SMF 214 can send a session establishment request that includes the second IP address assigned to UE 202 to UPF-3 216-3, which is the UPF to which chunk-3*b* is assigned. At Operation 332, UPF-3 216-3 can determine whether the second IP address assigned by SMF 214 to UE 202 matches an IP address in an internal IP chunks table of UPF-3 216-3. At Operation 334, when UPF-3 216-3 has successfully received a most recent IP address chunk assignment from SMF 214 that indicates that chunk-3*b* is indeed assigned to UPF-3 216-3, UPF-3 216-3 can determine that the second IP address assigned to UE 202 exists in its internal IP address chunks table and send a session establishment request acceptance message to SMF 214. At Operation 336, upon receiving the acceptance message from UPF-3 216-3, SMF 214 can send a message to the AMF 210 indicating that the PDU session request of UE 202 has been accepted. At Operation 338, the AMF 210 can send a message to UE 202 via a radio access node such as an eNodeB or a gNodeB of the wireless telecommunications network that the PDU session request has been accepted. As a result of the implementation of the technologies disclosed herein, PDU session failures in the wireless telecommunications network can be reduced and the network experience of the subscribers can be improved.

Figure 4A:
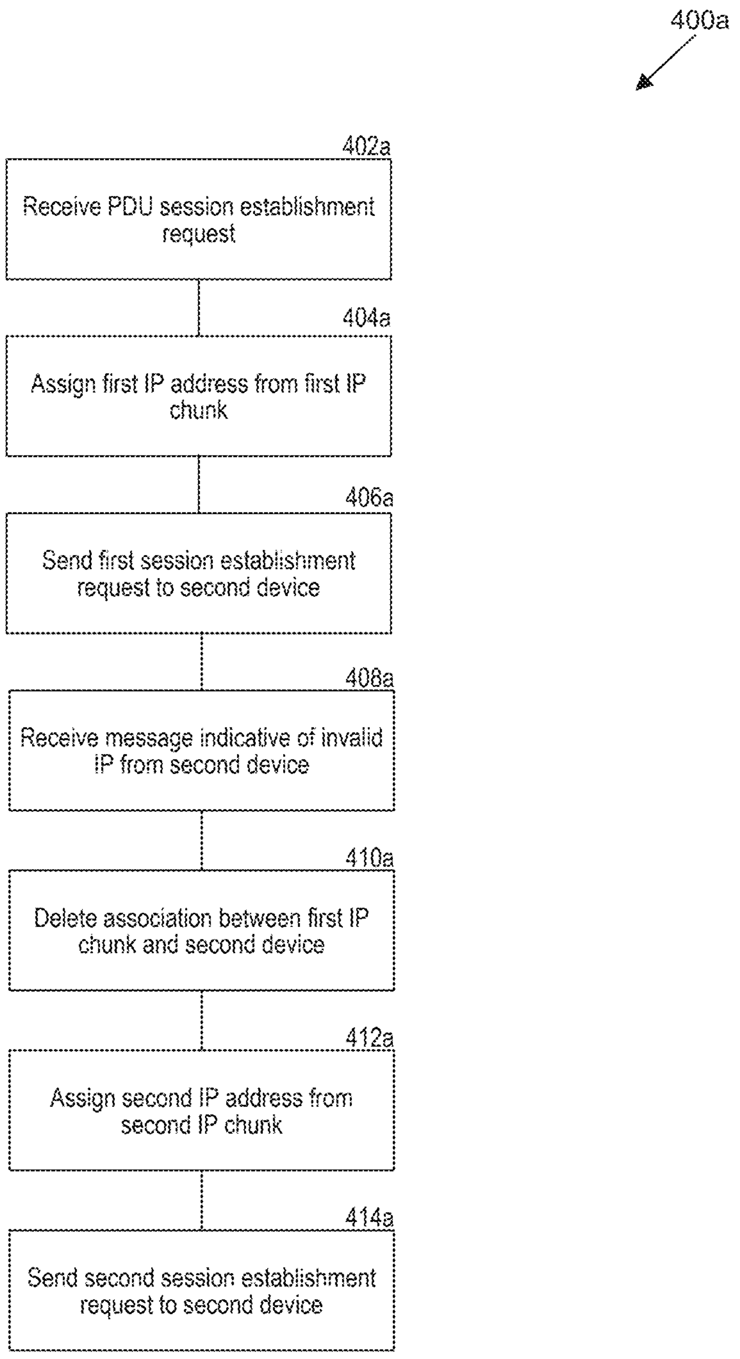
FIG. 4A is a flowchart of a process for implementing at least some aspects of the disclosed technology.

FIG. 4A is a flowchart of a method 400*a* for implementing at least some aspects of the disclosed technology. The method can be implemented on a first device that is configured to perform a control plane function in a wireless telecommunications network. At 402*a*, the first device can receive a protocol data unit (PDU) session establishment request associated with a user equipment (UE). In some implementations, the first session establishment request can include a request to establish a session according to a Fifth Generation (5G) protocol. In some implementations, the first session establishment request can include a request to establish a session according to a Long Term Evolution (LTE) protocol. In some implementations, the first session establishment request can include a request to establish a session according to a Wi-Fi protocol. At 404*a*, the first device can, in response to receiving the PDU session establishment request, assign a first internet protocol (IP) address from a first IP address chunk. The first IP address chunk can represent a set of IP addresses stored in an IP chunks table of the first device. Further, the first IP address chunk can be associated with a second device communicatively coupled with the first device that is configured to perform a user plane function in the wireless telecommunications network. At 406*a*, the first device can send a first session establishment request to the second device. The first session establishment request can include the first IP address. At 408*a*, the first device can receive a message from the second device indicating that the first IP address is not associated with the second device. At 410*a*, in response to receiving the message from the second device, the first device can delete the association between the first IP address chunk and the second device in the IP chunks table of the first device. At 412*a*, the first device can assign a second IP address to the UE from a second IP address chunk stored in the IP chunks table of the first device. At 414*a*, the first device can send a second session establishment request to the second device. The second session establishment request can include the second IP address. In some implementations, the second IP address chunk is associated with the second device in the IP chunks table of the first device. In some implementations, the second IP address chunk can be associated with a third device configured to perform a user plane function in the wireless telecommunications network.

Figure 4B:
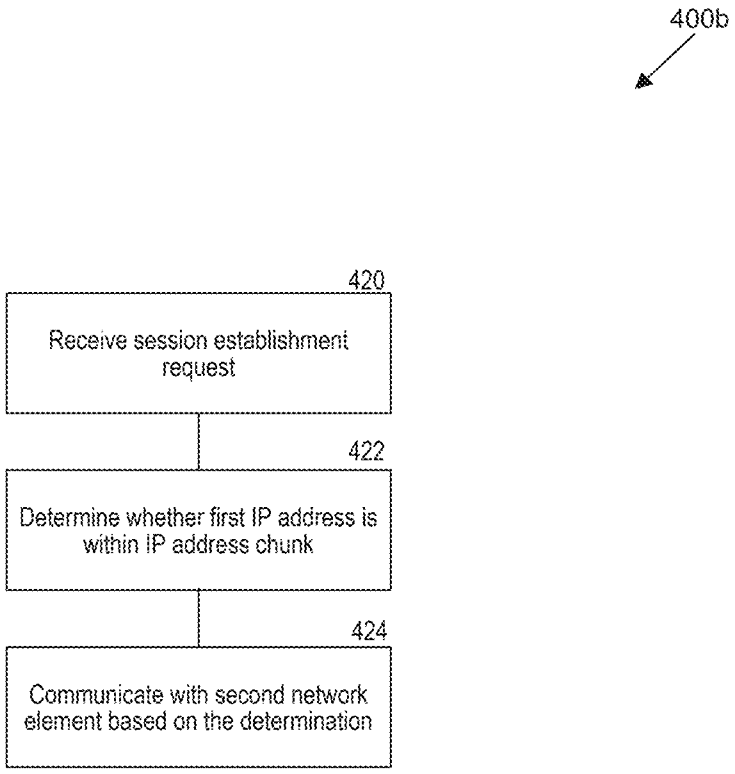
FIG. 4B is a flowchart of another process for implementing at least some aspects of the disclosed technology.

FIG. 4B is a flowchart of a method 400*b* for implementing at least some aspects of the disclosed technology. In some implementations, the method can be implemented on a first network element that is configured to perform a user plane function in a wireless telecommunications network. At 420, the first network element can receive a first session establishment request associated with a user equipment (UE) from a second network element that is communicatively coupled with the first network element. In some implementations, the first session establishment request can include a first internet protocol (IP) address assigned by the second network element. At 422, in response to receiving the first session establishment request, the first network element can determine whether the first IP address is within an IP address chunk that represents a set of IP addresses stored in an internal IP chunks table of the first network element. In some implementations, the IP address chunk can be assigned to the first network element by the second network element. At 424, the first network element can perform a communication with the second network element based on the determination.

Computer System

Figure 5:
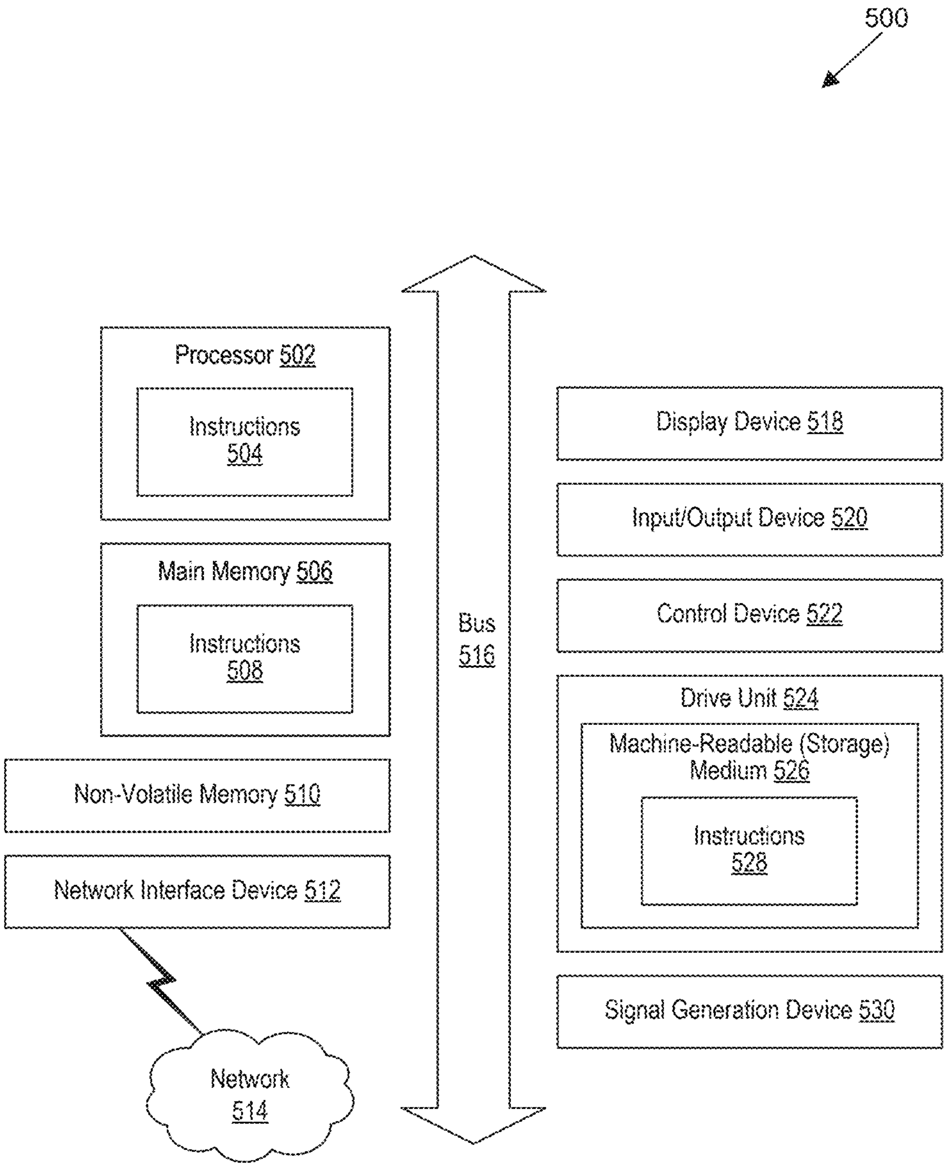
FIG. 5 is a block diagram that illustrates an example of a computer system in which at least some operations described herein can be implemented.

FIG. 5 is a block diagram that illustrates an example of a computer system 500 in which at least some operations described herein can be implemented. As shown, the computer system 500 can include: one or more processors 502, main memory 506, non-volatile memory 510, a network interface device 512, a video display device 518, an input/output device 520, a control device 522 (e.g., keyboard and pointing device), a drive unit 524 that includes a machine-readable (storage) medium 526, and a signal generation device 530 that are communicatively connected to a bus 516. The bus 516 represents one or more physical buses and/or point-to-point connections that are connected by appropriate bridges, adapters, or controllers. Various common components (e.g., cache memory) are omitted from FIG. 5 for brevity. Instead, the computer system 500 is intended to illustrate a hardware device on which components illustrated or described relative to the examples of the figures and any other components described in this specification can be implemented.

The computer system 500 can take any suitable physical form. For example, the computing system 500 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 500. In some implementations, the computer system 500 can be an embedded computer system, a system-on-chip (SOC), a single-board computer system (SBC), or a distributed system such as a mesh of computer systems, or it can include one or more cloud components in one or more networks. Where appropriate, one or more computer systems 500 can perform operations in real time, in near real time, or in batch mode.

The network interface device 512 enables the computing system 500 to mediate data in a network 514 with an entity that is external to the computing system 500 through any communication protocol supported by the computing system 500 and the external entity. Examples of the network interface device 512 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 506, non-volatile memory 510, machine-readable medium 526) can be local, remote, or distributed. Although shown as a single medium, the machine-readable medium 526 can include multiple media (e.g., a centralized/distributed database and/or associated caches and servers) that store one or more sets of instructions 528. The machine-readable medium 526 can include any medium that is capable of storing, encoding, or carrying a set of instructions for execution by the computing system 500. The machine-readable medium 526 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 510, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 504, 508, 528) set at various times in various memory and storage devices in computing device(s). When read and executed by the processor 502, the instruction(s) cause the computing system 500 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. A first device configured to perform a control plane function in a wireless telecommunications network, the first device comprising:

at least one hardware processor; and at least one non-transitory memory storing instructions, which, when executed by the at least one hardware processor, cause the first device to:

receive a protocol data unit (PDU) session establishment request associated with a user equipment (UE);

in response to receiving the PDU session establishment request, assign a first internet protocol (IP) address from a first IP address chunk, wherein the first IP address chunk represents a set of IP addresses stored in an IP chunks table of the first device, wherein the first IP address chunk is associated with a second device communicatively coupled with the first device, and wherein the second device is configured to perform a user plane function in the wireless telecommunications network;

send a first session establishment request to the second device, wherein the first session establishment request includes the first IP address;

receive a message from the second device indicating that the first IP address is not associated with the second device;

in response to receiving the message from the second device:

delete an association between the first IP address chunk and the second device in the IP chunks table of the first device;

assign a second IP address to the UE from a second IP address chunk stored in the IP chunks table of the first device; and send a second session establishment request to the second device, wherein the second session establishment request includes the second IP address.

2. The first device of claim 1, wherein the second IP address chunk is associated with the second device in the IP chunks table of the first device.

3. The first device of claim 1, wherein the second IP address chunk is associated with a third device configured to perform a user plane function in the wireless telecommunications network.

4. The first device of claim 1, further caused to:

communicate the second IP address to a fourth device communicatively coupled with the first device, wherein the fourth device is configured to provide a policy control function in the wireless telecommunications network or a charging function in the wireless telecommunications network.

5. The first device of claim 1, further caused to:

in response to receiving the message from the second device, generate a network alarm.

6. The first device of claim 1, wherein the first session establishment request includes a request to establish a session according to a Fifth Generation (5G) protocol, a Long Term Evolution (LTE) protocol, or a Wi-Fi protocol.

7. A system of a wireless telecommunications network, comprising:

a first device comprising at least a first hardware processor and at least a first non-transitory memory storing a first set of instructions, wherein the first device is configured to perform a control plane function in the wireless telecommunications network;

a second device comprising at least a second hardware processor and at least a second non-transitory memory storing a second set of instructions, wherein the second device is communicatively coupled with the first device and configured to perform a user plane function in the wireless telecommunications network;

wherein the first set of instructions, when executed by at least the first hardware processor cause the first device to:

receive a protocol data unit (PDU) session establishment request associated with a user equipment (UE);

in response to receiving the PDU session establishment request, assign a first internet protocol (IP) address from a first IP address chunk, wherein the first IP address chunk represents a set of IP addresses stored in an IP chunks table of the first device, and wherein the first IP address chunk is associated with the second device in the IP chunks table of the first device;

send, to the second device, a first session establishment request including the first IP address;

wherein the second set of instructions, when executed by at least the second hardware processor cause the second device to:

transmit a message to the first device indicating that the first IP address is not associated with the second device; and wherein the first set of instructions, when executed by at least the first hardware processor further cause the first device to:

receive the message from the second device; and in response to receiving the message from the second device:

delete an association between the first IP address chunk and the second device in the IP chunks table of the first device;

assign a second IP address to the UE from a second IP address chunk stored in the IP chunks table of the first device; and send a second session establishment request to the second device, wherein the second session establishment request includes the second IP address assigned from the second IP address chunk stored in the IP chunks table of the first device.

8. The system of claim 7, wherein the second IP address chunk is associated with the second device in the IP chunks table of the first device.

9. The system of claim 7, wherein the second IP address chunk is associated with a third device configured to perform a user plane function in the wireless telecommunications network.

10. The system of claim 7, wherein the first device is caused to:

communicate the second IP address to a fourth device communicatively coupled with the first device, wherein the fourth device is configured to provide a policy control function in the wireless telecommunications network or a charging function in the wireless telecommunications network.

11. The system of claim 7, wherein the first device is caused to:

in response to receiving the message from the second device, generate a network alarm.

12. The system of claim 7, wherein the first session establishment request includes a request to establish a session according to a Fifth Generation (5G) protocol.

13. The system of claim 7, wherein the first session establishment request includes a request to establish a session according to a Long Term Evolution (LTE) protocol, or a Wi-Fi protocol.

14. A method comprising:

receiving, at a first device configured to perform a control plane function in a wireless telecommunications network, a protocol data unit (PDU) session establishment request associated with a user equipment (UE);

in response to receiving the PDU session establishment request, assigning a first internet protocol (IP) address from a first IP address chunk, wherein the first IP address chunk represents a set of IP addresses stored in an IP chunks table of the first device, wherein the first IP address chunk is associated with a second device communicatively coupled with the first device, and wherein the second device is configured to perform a user plane function in the wireless telecommunications network;

sending a first session establishment request to the second device, wherein the first session establishment request includes the first IP address;

receiving a message from the second device indicating that the first IP address is not associated with the second device;

in response to receiving the message from the second device:

deleting an association between the first IP address chunk and the second device in the IP chunks table of the first device;

assigning a second IP address to the UE from a second IP address chunk stored in the IP chunks table of the first device; and sending a second session establishment request to the second device, wherein the second session establishment request includes the second IP address.

15. The method of claim 14, wherein the second IP address chunk is associated with the second device in the IP chunks table of the first device.

16. The method of claim 14, wherein the second IP address chunk is associated with a third device configured to perform a user plane function in the wireless telecommunications network.

17. The method of claim 14 further comprising:

communicating the second IP address to a fourth device communicatively coupled with the first device, wherein the fourth device is configured to provide a policy control function in the wireless telecommunications network or a charging function in the wireless telecommunications network.

18. The method of claim 14 further comprising:

in response to receiving the message from the second device, generating a network alarm.

19. The method of claim 14, wherein the first session establishment request includes a request to establish a session according to a Fifth Generation (5G) protocol or a Long-Term Evolution (LTE) protocol.

20. The method of claim 14, wherein the first session establishment request includes a request to establish a session according to a Wi-Fi protocol.

* * * * *